Dec. 4, 1951     E. S. CHRISTENSEN     2,577,181
CLUTCH
Filed March 2, 1950
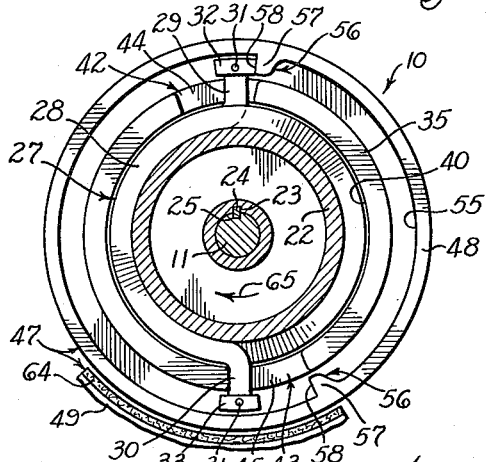
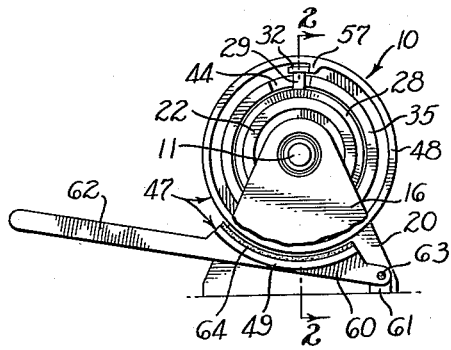
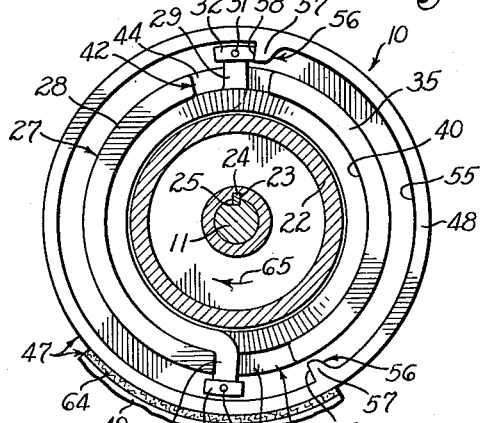
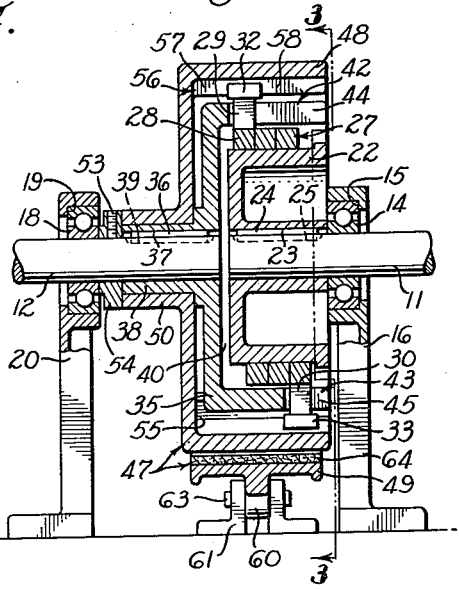
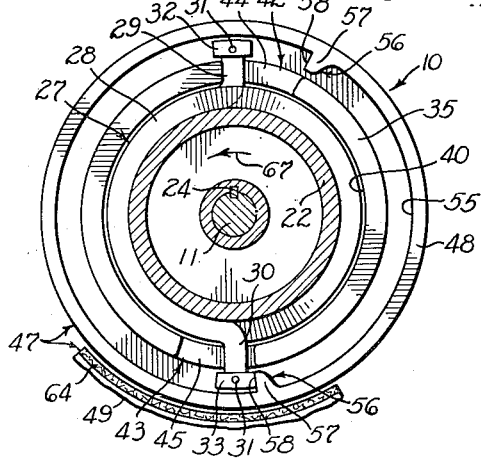
INVENTOR.
EDWIN S. CHRISTENSEN
BY HIS ATTORNEYS.
HARRIS, KIECH, FOSTER & HARRIS
BY Earl W. Harris Patented Dec. 4, 1951

2,577,181

UNITED STATES PATENT OFFICE 2,577,181

CLUTCH

Edwin S. Christensen, Long Beach, Calif.

Application March 2, 1950, Serial No. 147,265

2 Claims. (Cl. 192—17)

This invention relates to clutches and, more particularly, to a clutch for transmitting the movement of a rotary drive shaft to a rotary driven shaft.

It is a primary object of my invention to provide a clutch incorporating a driving drum and a driven drum and having disposed therebetween resilient engagement means adapted to transmit the movement of the driving drum to the driven drum, said engagement means being so formed as to absorb the initial shock which occurs when the driven drum is first energized by the driving drum.

A further object of my invention is the provision in a clutch of the aforementioned type of an engagement means which is constituted by a spring member securely mounted upon the driving drum and having a portion of its length in continual engagement with the driven drum.

Another object of my invention is the provision in a clutch of the aforementioned type of an engagement means constituted by a spiral spring securely mounted upon the driven drum and having at least one end portion projecting substantially radially of said driven drum to engage the driving drum to establish an operative relationship between said driving and driven drums.

A further object of my invention is the provision in a clutch of the aforementioned type of a driven drum provided with detent means for permitting the engagement of said driven drum by the ends of the spiral spring.

Another object of my invention is the provision of a clutch including a driving drum having securely mounted thereupon engagement means adapted to engage a driven drum in such a manner that, as the load upon the driven drum increases, the grip of the engagement means upon the driving drum becomes progressively greater.

A further object of my invention is the provision in a clutch of a driving drum having engagement means mounted thereupon engageable with a driven drum juxtaposed to said driving drum, said clutch having associated therewith disengagement means adapted to release said engagement means to free said driven drum from operative relationship with said driving drum.

An additional object of my invention is the provision of a clutch of the aforementioned type in which the engagement means is constituted by a spiral spring securely mounted upon the driving drum and in which the actuation of the aforesaid disengagement means causes said spring to release the periphery of said driving drum to free said spring from operative relationship with said driving drum.

A further object of my invention is the provision of a clutch of the aforementioned type which is equally effective in transmitting motion from the driving to the driven drums in both directions of rotation.

An additional object of my invention is the provision of a clutch which consists of a minimum number of component parts, which can be easily assembled and disassembled and which can be manufactured at a relatively low cost.

Further objects and advantages of my invention will be apparent from the following specification and the accompanying drawing, which is for the purpose of illustration only, and in which:

Fig. 1 is a side elevational view of a clutch constructed in accordance with my invention;

Fig. 2 is a vertical sectional view taken on the broken line 2—2 of Fig. 1;

Fig. 3 is a vertical, partly sectional view taken on the broken line 3—3 of Fig. 2 and showing the driving and driven drums in operative engagement with the component parts of the clutch rotating in a clockwise direction;

Fig. 4 is a vertical, partly sectional view similar to Fig. 3 and showing the disengagement means of the clutch energized to cause the engagement means thereof to release the driven drum to free the driving drum from operative relationship with the driven drum of the clutch; and Fig. 5 is a vertical, partly sectional view showing the component parts of the clutch rotating in a counterclockwise direction.

Referring to the drawing, and particularly to Figs. 1 and 2 thereof, I show a clutch 10 constructed in accordance with my invention and adapted to transmit the motion of a drive shaft 11 to a driven shaft 12, the ends of said drive and driven shafts 11 and 12 being juxtaposed. The drive shaft 11 is mounted in a ball bearing 14 pressed, or otherwise secured, in a cup 15 in the upper end of a standard 16. The driven shaft 12 is rotatably supported in a ball bearing 18 disposed within a cup 19 provided in the upper end of a standard 20 which is spaced from, but located directly opposite the standard 16.

Secured to the end of the drive shaft 11 is a driving drum 22 which has formed in an axial bore thereof a keyway 23 for receiving a key 24 disposed in a keyway 25 in the end of the drive shaft 11, the key 24 preventing relative rotation between the driving drum 22 and the drive shaft 11.

Mounted upon and encompassing the periphery of the driving drum 22 is an engagement means 27 constituted by a spiral spring 28, the coils of which are tightly wound about the periphery of the driving drum 22 and the end portions 29 and 30 of which project outwardly therefrom in a direction substantially radial of the axis of the drive shaft 11 and the driving drum 22. Fastened respectively to the ends 29 and 30 of the spiral spring 28, as by means of pins 31, are collars 32 and 33 which serve a purpose which will be described in greater detail below.

A driven drum 35 is mounted upon the end of the driven shaft 12 and secured against rotation thereupon by means of a key 36 disposed in a keyway 37 formed in the hub 38 of the driven drum 35 and a keyway 39 formed in the driven shaft 12, said driven drum providing a substantially cylindrical cavity 40 which encompasses the driving drum 22 and the engagement means 27 mounted thereupon.

The rim of the driven drum 35 is provided with detent means 42 and 43 constituted respectively by oppositely disposed slots 44 and 45 formed therein and respectively adapted to receive the radially directed end portions 29 and 30 of the spiral spring 28. As best shown in Figs. 3 to 5 of the drawing, the radially directed end portions 29 and 30 of the spiral spring 28 are respectively adapted to engage the side walls of the slots 44 and 45 when the clutch 10 is rotated in either a clockwise or a counterclockwise direction, as will be described in greater detail below. Thus, the detent means 42 and 43, as constituted by the slots 44 and 45, serve to permit the engagement means 27, as constituted by the spiral spring 28, to join the driving drum 22 and the driven drum 35 in operative relationship with each other.

The clutch 10 is provided with disengaging means 47, said disengagement means including a brake drum 48 and a brake shoe 49 adapted to coact therewith. The brake drum 48 is disposed upon the hub 38 of the driven drum 35 by means of a hub portion 50 formed integrally therewith, said hub portion 50 being freely rotatable in reference to the hub 38 of the driven drum 35. Thus, when the driving drum 22 and the driven drum 35 are held in operative engagement with each other by means of the engagement means 27 and torque is transmitted therethrough from the drive shaft 11 to the driven shaft 12, the brake drum 48 rotates freely upon the hub 38 of the driven drum 35. Secured to the periphery of the driven shaft 12, as by means of a set screw 53, is a thrust collar 54 which maintains the brake drum 48 in operative position upon the hub 38 of the driven drum 35. The brake drum 48 provides a substantially cup-shaped cavity 55 which encompasses the periphery of the driven drum 35 and thus constitutes the exterior housing for the clutch 10.

Formed upon the interior of the brake drum 48 and projecting into the cavity 55 therein is a plurality of release means 56 exemplified, in the present instance, as tooth-like projections 57 providing faces 58 engageable by the collars 32 and 33 on the end portions 29 and 30 of the spiral spring 28.

The brake shoe 49 has integrally formed therewith a lever 60, the lower end of which is pivotally mounted in a bracket 61 by means of a pin 63 and the upper end of which constitutes a handle 62 engageable by the operator to force a segment of brake lining 64 mounted in the brake shoe 49 against the periphery of the brake drum 48 to retard the free rotary movement of the brake drum 48 upon the hub 38 of the driven drum 35 as torque is transmitted from the drive shaft 11 to the driven shaft 12.

When the clutch 10 is rotated in a clockwise direction, as best shown in Figs. 3 and 4 of the drawing, and as indicated by the arrow 65, the radial end portion 30 of the spiral spring 28 is rotated into contact with the left-hand side wall of the slot 45. Since the spiral spring 28 is wound about the periphery of the driving drum 22 so that the coils of the spring firmly grip the periphery of the drum, the contact of the end portion 30 with the left-hand side wall of the slot 45 causes the rotation of the end portion 30 to be communicated to the driven drum 35 to accomplish the rotation thereof. As the initial contact load is imposed upon the end portion 30 of the spiral spring 28 the coils of the spring are urged into more intimate contact with the periphery of the driving drum 22 and, if the load upon the driven shaft 12 is increased, the retardation effect of the increased load, as transmitted into the driven drum 35 and the end portion 30 of the spiral spring 28, causes the coils of the spring to grip the periphery of the driving drum 22 with a force which is proportional to the increase in the load imposed upon the driven drum 35. This proportional increase in the force with which the coils of the spiral spring 28 engage the periphery of the driving drum 22 as the load upon the driven drum 35 is increased is an important feature of my invention because it eliminates the slippage frequently encountered in conventional clutches when the load upon the driven member is suddenly or substantially increased. Also of importance is the fact that the initial shock load imposed when the end portion 30 of the spiral spring 28 contacts the left-hand side wall of the slot 45 is absorbed by said spring, the coils of the spring being sufficiently resilient to absorb the shock load and to prevent the wear and consequent failure caused in conventional clutches by such loads.

As the clutch 10 rotates in a clockwise direction, the brake drum 48 rotates freely upon the hub 38 of the driven drum 35 because the collar 32 mounted upon the end portion 29 of the spiral spring 28 engages one of the release means 56 to cause such rotation. When it is desired to free the driven drum 35 from operative relationship with the driving drum 22, the handle 62 of the lever 60 upon which the brake shoe 49 is mounted, is raised to bring the brake lining 64 into contact with the periphery of the brake drum 48. When this action occurs, the release means 56 in contact with the collar 32 upon the end portion 29 is held against movement by the immobility of the brake drum 48, causing the consequent cessation of rotation of the end portion 29. The driving drum 22 continues to rotate but, since the end portion 29 is held against rotation the effect of the rotation of the driving drum 22 is to sufficiently unwind the coils of the spring 28 from contact with the periphery of the driving drum 22 to prevent the effective transmission of torque from the driving drum into said coils.

The release of the coils of the spiral spring 28, as induced by the braking action of the brake drum 48 is best illustrated in Fig. 4 of the drawing, although it should be understood that the unwinding of the coils of the spring is greatly exaggerated in order to illustrate the manner in which the release of the driving drum is accomplished. To throw the clutch in, the handle 62 of the lever 61 is released to permit the free rotation of the brake drum 48 and the concomitant release of the end portion 29 of the spiral spring 28. When the end portion 29 of the spiral spring 28 is released, the coils of the spring once again engage the periphery of the driving drum 22 and the operative relationship between the driving and driven drum is once again established.

The manner in which the transmission of torque in a counterclockwise direction is accomplished is best illustrated in Fig. 5 of the drawing, wherein the movement of the driving drum 22 is transmitted to the driven drum 35 by means of the engagement of the end portion 29 of the spiral spring 28 with the left-hand side wall of the slot 44. During the rotation of the clutch in the counterclockwise direction, as indicated by the arrow 67, the collar 33 on the end portion 30 of the spring 28 is in contact with the release boss 57 to cause the concomitant rotation of the brake drum 48. The clutch is released in the manner indicated above with the distinction that the immobilization of the end portion 30 of the spring 28 causes the release of the driving drum 22 to free the driving drum 22 from operative relationship with the driven drum 35.

I thus provide, by my invention, a clutch which is characterized by extreme simplicity of construction and a minimum number of long-lived simple component parts. It may be easily assembled and disassembled. In addition, the initial shock load imposed upon the clutch when the transmission of torque from the drive to the driven shaft is initiated is absorbed by the engagement means of the clutch, thus eliminating a cause of trouble encountered in conventional clutches. Further, as the load imposed upon the driven shaft is increased there is a proportional increase in the force with which the engagement means of the clutch grips the driving drum to prevent slippage encountered in conventional clutches under such conditions.

Although I have shown and described a preferred embodiment of my invention for the purpose of illustrating the construction and mode of operation thereof, it is obvious that changes, modifications and alterations may be made in the specific details of said construction and I, therefore, do not desire to be limited to such details of construction but prefer, rather, to be afforded the full scope of the following claims.

I claim as my invention:

1. In a clutch for the transmission of power from a drive shaft to a driven shaft, the combination of: a driving drum mounted upon one end of said drive shaft; a spiral spring mounted upon said driving drum having its end portions projecting radially of the axis of said driving drum; a driven drum mounted upon one end of said driven shaft and substantially encompassing said driving drum, said driven drum having a plurality of openings in which said end portions are disposed to permit one of said end portions, when rotated by said driving drum, to engage the wall of one of said openings to transmit the movement of said driving drum to said driven drum; a brake drum encompassing said driven drum, said brake drum having release means formed thereupon engageable by the other end portion; and a brake for retarding the movement of said brake drum to hold said release means in contact with said other end portion.

2. In a clutch for the transmission of power from a drive shaft to a driven shaft, the combination of: a driving drum mounted upon one end of said drive shaft; a spiral spring mounted upon said driving drum having its end portions projecting radially of the axis of said driving drum; a driven drum mounted upon one end of said driven shaft and substantially encompassing said driving drum, said driven drum having a plurality of openings in which said end portions are disposed to permit one of said end portions, when rotated by said driving drum to engage the walls of one of said openings to transmit the movement of said driving to said driven drum; a brake drum encompassing said driven drum, said brake drum having inwardly projecting bosses formed thereupon engageable by the other end portion; and a brake for retarding the movement of said brake drum to hold said bosses in contact with said other end portion.

EDWIN S. CHRISTENSEN.

REFERENCES CITED

The following references are of record in the file of this patent:

UNITED STATES PATENTS

| Number | Name | Date |
|---|---|---|
| 1,843,523 | Starkey et al. | Feb. 2, 1932 |
| 2,002,979 | Fisher | May 28, 1935 |
| 2,004,650 | Collyear et al. | June 11, 1935 |
| 2,475,432 | Marihart | July 5, 1949 |

FOREIGN PATENTS

| Number | Country | Date |
|---|---|---|
| 224,274 | Great Britain | Nov. 3, 1924 |